Aug. 2, 1960  B. W. BAILEY  2,947,656
PROCESSING OF SPENT COOKING LIQUORS
Filed April 15, 1957  2 Sheets-Sheet 1
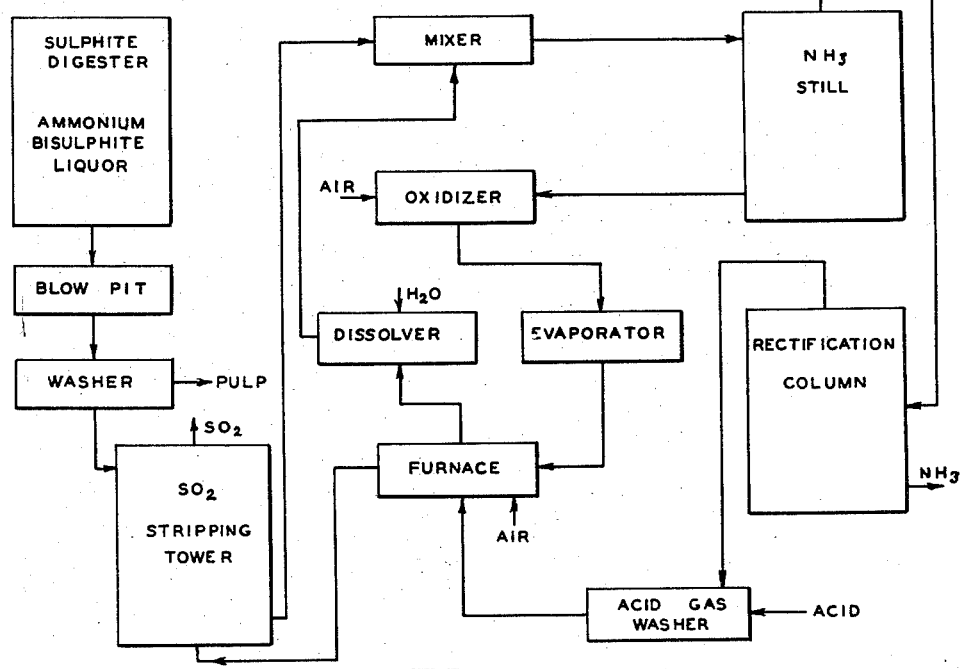
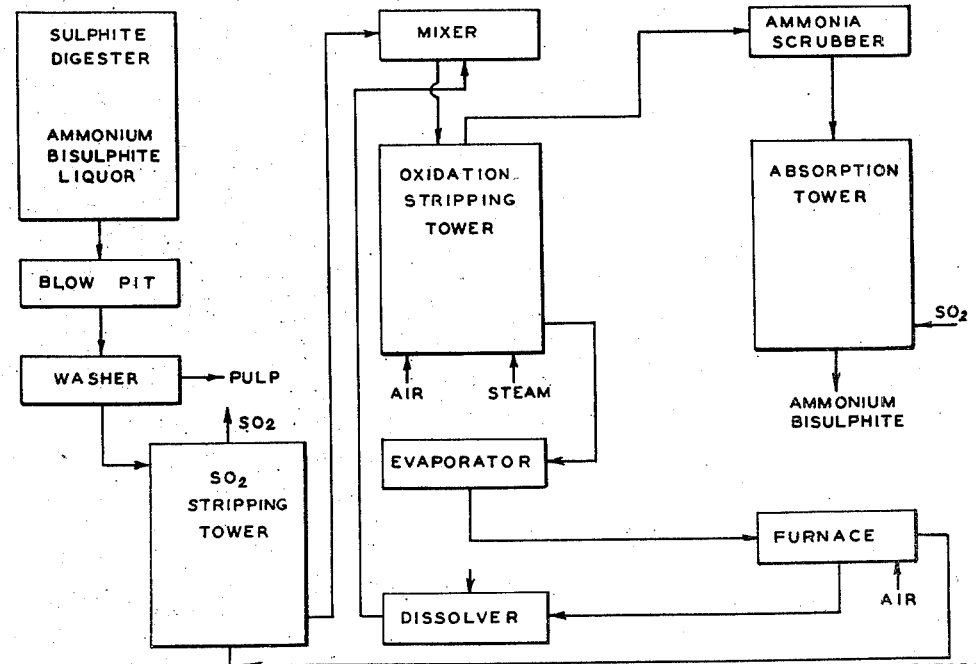
INVENTOR:
BERRY W. BAILEY
BY Harold L. Jenkins
ATTY Aug. 2, 1960        B. W. BAILEY        2,947,656

PROCESSING OF SPENT COOKING LIQUORS

Filed April 15, 1957        2 Sheets-Sheet 2

INVENTOR
BERRY W. BAILEY
BY Harold L. Jenkins
ATTY

United States Patent Office
2,947,656
Patented Aug. 2, 1960

2,947,656
PROCESSING OF SPENT COOKING LIQUORS
Berry W. Bailey, Mukilteo, Wash., assignor to Scott Paper Company, Chester, Pa., a corporation of Pennsylvania
Filed Apr. 15, 1957, Ser. No. 652,763
14 Claims. (Cl. 162—32)

This invention relates to processes used in the pulping of cellulosic materials, such as in the preparation of pulp from wood. More specifically it relates to the ammonia-base sulphite cooking of wood pulp and even more specifically it relates to processes for recovering heat values and chemicals from an ammonia-base sulphite cooking liquor, and relates to the recovery of ammonia and sulphur dioxide in such states of purity that they are suitable for reuse in a cyclical process comprising the ammonia-base sulphite digestion of ligno-cellulosic material to produce pulp.

It is well known that ammonium bisulphite pulping processes possess advantages over alternate processes such as the standard calcium bisulphite process. For example, superior pulps at higher yields are obtained. Notwithstanding such superiority, the ammonia-base process has been handicapped due to the high cost of the consumed ammonia in comparison with limestone in the calcium-base process. The over-all commercial value of an ammonia-base bisulphite process may be improved by the recovery of ammonia and sulphur values in form suitable for reuse in such process. In recent years the pollution of inland and coastal waters by the spent liquors from the various bisulphite pulping processes have come to be an important consideration since the public authorities such as the State pollution commissions require that the pollution brought about by these spent liquors be greatly reduced. This requires that the spent liquor be eliminated from these waters. Extensive studies in connection with these recoveries and pollution control have been in progress for more than twenty-five years.

More recently some success in recovering ammonia and sulphur has been achieved. For example, it has been proposed to recover the ammonia in the spent liquor by the addition of kraft black liquor in sufficient quantity for the ammonia to be liberated by distillation. The active agents for ammonia recovery are the alkaline sodium compounds, such as sodium carbonate and sodium hydroxide, present in the black liquor from this kraft pulping process. Such process requires the combination therewith of a second operation in a pulp mill involving an alkaline sodium base (containing sodium hydroxide) in a digestion process or for the caustic alkali refinement of pulp. The caustic alkali values essential to the operation of these complementary processes are secured by causticizing appropriate recovered sodium salts. Such sulphides as are developed in the burning of the mixed kraft and ammonia-base bisulphite spent liquors are used in the kraft process. The improvement of such process was based upon an independent kraft operation and a dependent ammonium bisulphite process utilizing the unused alkaline values remaining in the kraft black liquor for recovery of ammonia.

A more recent proposal involves a cyclical method of treating ammonia-base sulphite spent liquor or a mixed ammonia-and-magnesia-base sulphite spent liquor with magnesium oxide and distilling to liberate the ammonia. Chemicals, for reuse, are recovered in this process by concentrating the ammonia-freed spent liquor, burning the combustible content to recover heat values under oxidizing conditions and simultaneously obtaining in the ash, magnesium oxide and in the hot gases, sulphur dioxide. In connection with the proposed use of magnesium-oxide ash for recovery of ammonia, the low solubility of magnesium oxides results in the very slow release of ammonia over a considerable period of time making the recovery of ammonia difficult. The cost of magnesium is also higher than for sodium, and magnesium losses in a recovery cycle are larger.

I have found that it is possible simultaneously with the recovery of heat values to recover economically both ammonia and sulphur dioxide in suitable purity for reuse in a unitary cyclical ammonia-base bisulphite cooking operation by employing alkaline sodium compounds and heating for liberation of the ammonia in the recovery cycle provided a novel combination of steps is included in the recovery cycle. The success of such procedure was not to have been expected in view of prior teaching that in the use of sodium hydroxide for recovering ammonia from the liquor, the sodium base would be lost for reuse in the process since under the conditions of combustion it would form an ash of mixed sulphur compounds of a type unsuitable for use in the regeneration of ammonia from the spent liquor or in the sulphite pulping process.

With the foregoing in mind, it is an object of this invention to provide an essentially self-sustaining cyclical ammonia-base sulphite cooking process involving the recovery of ammonia from the spent liquor by the addition thereto of alkaline sodium compounds recovered from smelt obtained by burning the combustible content of an ammonia-freed spent liquor.

It is a further object to provide a unitary, cyclical ammonia-base sulphite cooking process that results in a balanced recovery of ammonia and sulphur dioxide through use of alkaline sodium compounds for the recovery of ammonia from the spent liquor.

It is still a further object to recover heat values, usable to produce process steam, from the combustible portion of the ammonia-base system's spent liquor.

Further objects will be apparent from a consideration of this specification, claims and drawings.

According to this invention, there is provided a cyclical method for chemical recovery from a pulping process wherein a cooking liquor containing an ammonium sulphur salt is employed which comprises combining spent liquor from such pulping process with a smelt solution containing alkaline sodium compounds from a source hereinafter described or with sodium carbonate and/or sodium bicarbonate derived from said smelt solution, the amount of alkaline sodium compounds employed being sufficient for the liberation of the available ammonia content of said spent liquor and to provide the spent liquor with a pH of at least about 7 after liberation of ammonia therefrom, liberating ammonia from said liquor, recovering said liberated ammonia as ammonium compounds essentially free of sulphides and thiosulphates, burning the combustible portion of said liquor under self-sustaining conditions with a quantity of oxygen-containing gas in a kraft type recovery furnace in a similar manner to the burning of sulphate black liquor wherein a bed of hot burning black ash (reducing zone) is maintained at the bottom of the furnace, the sodium sulphur compounds are reduced by the carbon and carbon monoxide present, and a smelt is formed, oxidizing sulphides in the gases to sulphur dioxide by means of an oxygen-containing gas, recovering said sulphur dioxide, and forming a solution of said smelt for direct admixture with said spent liquor or to provide a source for alkaline sodium compounds to be added to said spent liquor.

For the purpose of illustrating the invention there are shown in the accompanying drawings forms thereof which are at present preferred, although it is to be understood that the several instrumentalities of which the invention consists can be variously arranged and organized and that the invention is not limited to the precise arrangements and organization of the instrumentalities as herein shown and described.

With the foregoing considerations in mind, the present invention may be better comprehended by reference to the accompanying drawings wherein:

Figure 1 is a flow diagram depicting one embodiment of this invention for chemical recovery for an ammonia-base sulphite pulp cooking process.

Figure 2 is a flow diagram of another embodiment of a recovery method for an ammonia-base sulphite pulp cooking process.

Figure 3:
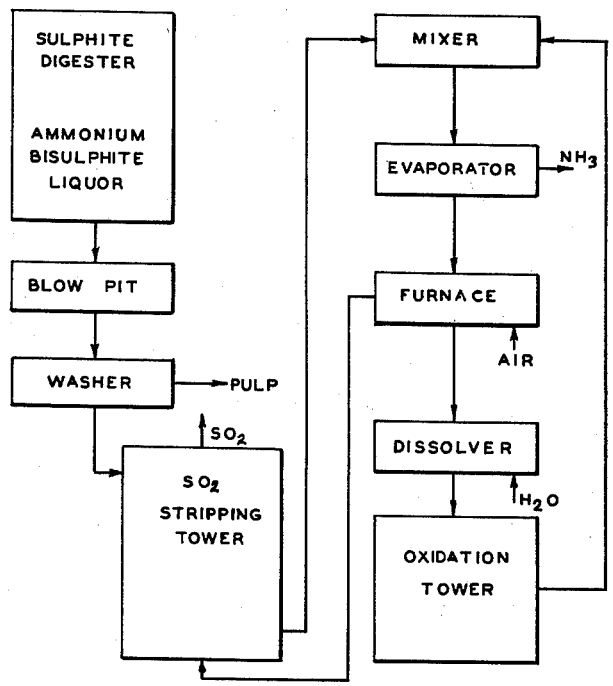
Figure 3 is a flow diagram of a modified recovery process embodying the present invention.

I have found that the cyclical process of recovery and reuse of ammonia and sulphur dioxide can be effected by employing alkaline sodium compounds in the recovery of the available ammonia of spent liquor. These alkaline sodium compounds are secured by burning the combustible content of the ammonia-freed concentrated spent liquor under reducing conditions, more fully described hereinafter, to produce mixed sodium salts comprising essentially sodium carbonate and sodium sulphide while a regulated but sufficient amount of air is added to the hot furnace gases after they have left the reducing zone to oxidize to sulphur dioxide the volatile sulphur compounds such as hydrogen sulphide. At the same time, recovered gases containing $H_2S$ that have been separated by purification steps, as will be hereinafter described, are united with hot furnace gases and their $H_2S$ content likewise oxidized to sulphur dioxide.

Since the water soluble content of the smelt consists mainly of sodium carbonate and sodium sulphide, the sodium values and sulphur values have thus been preserved in potentially useful form. In order that a solution of this smelt may find use in the recovery of ammonia of satisfactory purity, provision has been made to separate or otherwise transform the sulphide content so that ultimately it can be advantageously led to the oxidizing zone of the furnace for conversion to useful sulphur dioxide.

The recovered ammonia and sulphur dioxide, substantially free of sulphides and thiosulphates as a result of steps which are provided in the recovery cycles, are suitable for reuse in making up various types of cooking liquors composed of a combination of water, ammonia and sulphur dioxide. It will be necessary to add make-up amounts of ammonia, sulphur dioxide and sodium compounds to compensate mainly for physical losses in the digestion and recovery cycles but these make-up amounts have been reduced to a minimum because of the high chemical efficiency of the recovery cycles.

Referring now to Figure 1, there is illustrated a well-known pulp digester equipped with indirect heating means, (not shown). The digester is charged in a normal manner with wood chips and a cooking liquor containing ammonium bisulphite and free sulphur dioxide. The cooking liquor is circulated in known manner and heated by means of the usual type liquor heater.

During the cooking operation, the digester is side relieved at about 130° C. to adjust the liquor level. The digester is also pressure relieved, the released gases being recovered for reuse by known methods. At the completion of the cooking operation, the contents of the digester are discharged to a blow pit from which the gases may be vented to a surphur dioxide recovery system if desired, or to the atmosphere. The pulp is separated from the spent liquor and sent through one or more washers to subsequent processes of screening, bleaching, etc., and finally to pulp storage (not shown). The strong liquor together with some portions of wash liquor may be sent to temporary storage or may be sent directly to a sulphur dioxide stripping tower where it is treated with the hot gases containing sulphur dioxide from the recovery furnace. This treatment releases the sulphur dioxide from the spent liquor, the liberated sulphur dioxide unites with the additional amounts of sulphur dioxide in the hot furnace gases, and the $SO_2$ is led to an absorption column wherein is prepared ammonia-base sulphite digester liquor.

Dilute spent liquor which has been stripped of free and loosely-combined $SO_2$ in the $SO_2$ stripping tower is mixed with smelt liquor, consisting essentially of sodium carbonate and sodium sulphide, and which may be obtained as hereinafter described. Enough smelt liquor is combined with the spent liquor to insure liberation by distillation of substantially all of the available ammonia. Preferably the amount of alkaline sodium compounds should be sufficient that the combined liquors remain alkaline after the ammonia has been distilled therefrom.

The thus alkalized spent liquor is transferred to an ammonia still and heated. The ammonia vapors and gases which are volatilized are led to the central section of a rectification column which is operated in such manner that partial separation between ammonia and hydrogen sulphide takes place. The major portion of ammonia is withdrawn from the bottom of the column as crude ammonia, containing small amounts of $H_2S$, while the gases containing most of the $H_2S$ as well as $CO_2$ and small amounts of ammonia are removed from the top of the column and sent to the recovery furnace.

The crude ammonia, containing small amounts of $H_2S$, may be further refined by a further distillation and passage of the ammonia gases through a caustic soda scrubber (not shown) for absorption of any hydrogen sulphide residues. The ammonia gases free of $H_2S$ may then be led to an $SO_2$ absorption column of the type disclosed in Figure 2 for the regeneration of ammonia-base sulphite liquor.

The spent liquor from which the ammonia has been removed is pumped from the ammonia still to an oxidizer or oxidation tank, and any volatile sulphur compounds remaining in the liquor are oxidized by air to non-volatile sulphur compounds. The oxidized spent liquor is then evaporated in an evaporator to approximately 50% total solids content and delivered to a recovery furnace where it is burned under self-sustaining combustion conditions in a reducing atmosphere, more fully described hereinafter, whereby a smelt is obtained containing assentially sodium carbonate and sodium sulphide. The hot gases resulting from the combustion, after leaving the reducing zone, together with the volatile sulphur compounds separated from the ammonia vapors in the rectification column, but after passing through an acid scrubber to remove traces of ammonia, are subjected to oxidation by means of added air to promote the formation of sulphur dioxide therein. The hot oxidized gases which leave the furnace, after removal by known means, such as cyclone separators, of entrained solid and liquid matter, are employed as described above, for removal of free and loosely-combined sulphur dioxide in the spent ammonia-base sulphite liquor. The heat from the combustion is used to generate process steam.

In Figure 2 dilute spent liquor, which has been separated from the pulp in the washers and stripped of free and loosely combined sulphur dioxide in the stripping tower, is mixed in a suitable apparatus with smelt liquor which consists essentially of sodium carbonate and sodium sulphite as hereinbefore described. A sufficient amount of the smelt liquor is added to the spent liquor to insure liberation by distillation of substantially all of the available ammonia. It is preferred that the added smelt liquor should be in such proportions that the combined liquors remain alkaline after the ammonia has been removed therefrom.

The ammonia is stripped from the alkalized spent liquor by means of steam and an oxygen-containing gas such as air in the oxidation-stripping tower. The air functions both as a stripping gas and oxidizing agent to convert volatile sulphides, such as $H_2S$, and the like, to non-volatile sulphur compounds. The stripping tower is so operated (i.e., the proportions of air and steam and the rate of distillation are such), and the dimensions of the tower are such (i.e., length of the column and the distance between the entering mixed liquor and the top of the tower) that substantially all of the available ammonia may be stripped from the mixed liquors while at the same time large amounts of foam are generated above the entering mixed liquors to facilitate the oxidation of sulphides and assure the recovery of a sulphide-free ammonia. The ammonia that is stripped from the mixture of oxidized spent liquor and smelt liquor passes through an ammonia scrubber and the solution containing ammonium compounds resulting therefrom is directed to the absorption column for making ammonia-base sulphite cooking liquor.

The spent liquor, after being freed of ammonia and after removing any insoluble matter, as for example by filtration, is evaporated in the evaporators to approximately 50% solids. The concentrated liquor is then delivered to the recovery furnace where the combustible content is burned under self-sustaining combustion conditions in a reducing atmosphere to produce a smelt containing essentially sodium carbonate and sodium sulphide. The hot gases resulting from the combustion contain volatile sulphides and after leaving the reducing zone are oxidized to sulphur dioxide by means of added air led into the oxidizing zone. These hot gases containing sulphur-dioxide and carbon dioxide are, after removal of entrained matter, employed to strip free and loosely combined sulphur-dioxide from the spent liquor. The heat from the combustion is used to generate process steam.

The smelt, consisting essentially of sodium carbonate and sodium sulphide, is sent to the dissolving tank and then to the mixer for combination with the spent liquor.

In Figure 3, dilute spent liquor, which has been stripped of free and loosely combined sulphur dioxide in the stripping tower, is mixed in a mixer with a smelt solution that has been oxidized, as will be hereinafter described. Sufficient oxidized smelt liquor is added in the mixer, prior to evaporation, to liberate the available ammonia and it is preferred to add enough so that the liquor will remain alkaline after the ammonia has been distilled off. This alkalized mixed liquor is then concentrated in evaporators whereby ammonia (for reuse) is obtained in the distillate and the solids content of the concentrated liquor is increased to about 50%. The recovered ammonia is directed to an absorption column, such as that illustrated in Figure 2, for making ammonia-base sulphite cooking liquor. The concentrated spent liquor is burned in the recovery furnace so that a smelt is obtained in a reducing atmosphere. Secondary air is added in an oxidizing zone to oxidize the $H_2S$ to sulphur dioxide in the hot gases leaving the reducing zone. The hot gases, after removal of entrained solid and liquid matter are used to strip free and loosely combined sulphur-dioxide from spent liquor. The heat from the combustion is used to generate process steam.

Water solutions of the entrained matter and the smelt are filtered and brought together. The combined filtrates containing essentially sodium carbonate and sodium sulphide are oxidized in liquid phase in an oxidation tower by means of air and heat in such manner that little or no volatile sulphides escape with the air but are converted to thiosulphates and other non-volatile sulphur compounds. This oxidized solution, which is free of volatile sulphides is reserved for treatment of spent liquor required before liberation of ammonia.

Figure 4:
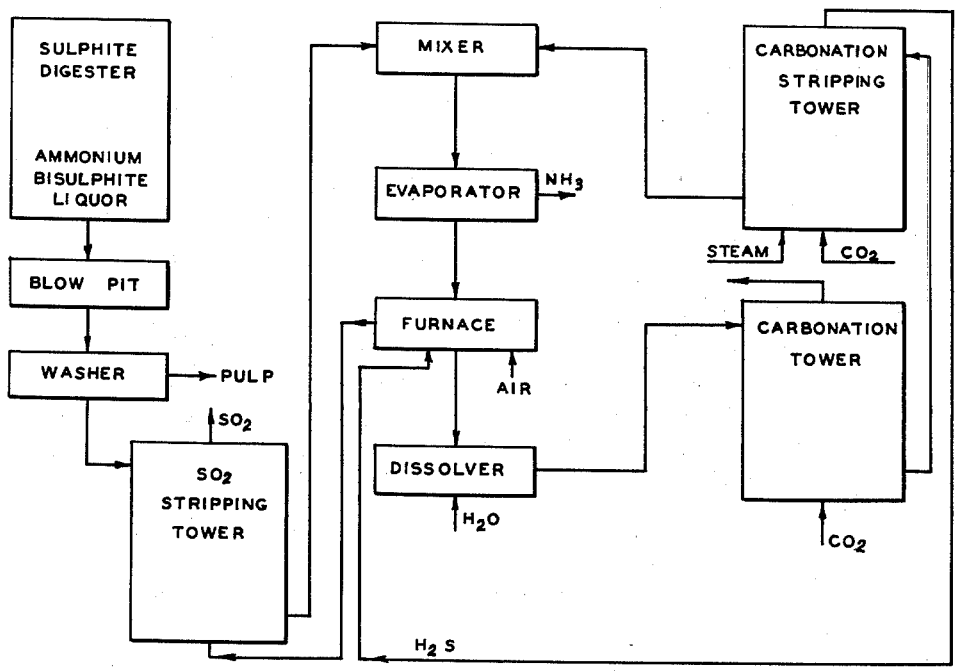
Figure 4 is a flow diagram of yet another recovery process embodying the present invention.

In Figure 4, dilute spent ammonium sulphite liquor which has been stripped of free and loosely combined sulphur dioxide in a stripping tower, is mixed in a mixer with carbonated smelt liquor, made in accordance with methods which will be hereinafter described. The carbonated smelt liquor consists essentially of sodium carbonate and sodium bicarbonate. The amount of carbonated smelt liquor employed should be sufficient for the liberation of substantially all of the available ammonia by distillation and preferably sufficient to maintain alkalinity in the system after the ammonia has been removed therefrom.

The treated solution is then concentrated in evaporators by well known methods to a solids content of about 50%. In this concentration the ammonia is distilled off and recovered in the condensate. The ammoniacal condensate is employed for absorption of sulphur dioxide to make fresh ammonia-base sulphite cooking liquor. Condensates containing little or no ammonia can be used in appropriate steps in the process as make-up water.

The concentrated spent liquor is delivered to a recovery furnace having a combustion chamber and boiler compartment and the combustible content burned therein under self-sustaining combustion conditions whereby a smelt is obtained in a reducing atmosphere. Hydrogen sulphide, water vapor, nitrogen, and other gases from the top of the carbonating tower, which will be hereinafter described, also enter the furnace and the hydrogen sulphide content is burned to sulphur dioxide in the oxidizing zone by means of added air, as is also part of the sulphur compounds present in the ammonia-stripped spent liquor. These hot gases containing sulphur-dioxide, after removal of entrained matter, are employed in stripping free and loosely combined sulphur dioxide from spent liquor and then directed to the absorption system (not shown) for making fresh ammonia-base sulphite cooking liquor. Heat from the combustion is used to make process steam.

The entrained solids above referred to, more especially the sodium carbonate content, are dissolved in water in the dissolving tank and the solution filtered to separate insoluble compounds and unburned carbon particles therefrom. The water soluble portion of the smelt is dissolved in water and the solution filtered of any insolubles, and the filtrate joined with that from the solution of the entrained matter.

This resultant solution containing essentially sodium carbonate and sodium sulphide is preferably carbonated sufficiently in a short carbonation tower to convert all sulphide ions to hydrosulphide ions and all hydroxyl ions to carbonate ions by introducing the solution into the top of the tower counter-current to a gas stream containing more carbon dioxide than required by the above-mentioned carbonation reactions, the dimensions of the tower are such, and the manner of operation is such, that the gas stream leaving the top of the tower is essentially free of hydrogen sulphide. This gas stream may be discharged to the atmosphere.

The carbonated solution from the bottom of the carbonation tower is further carbonated and the hydrosulphide and sulphide ions are converted to hydrogen sulphide and stripped from the solution by feeding the solution into the top of a carbonation stripping tower counter-current to a gas stream containing sufficient carbon dioxide for the conversion of all alkaline sodium compounds in the solution into sodium carbonate and sodium bicarbonate. Preferably the carbonation stripping tower is operated at an elevated temperature to increase the rate of hydrogen sulphide removal.

The gas stream containing carbon-dioxide preferably originates from the furnace gases containing $SO_2$ and $CO_2$ which are employed first to strip free and loosely combined sulphur dioxide from the spent liquor, thence led to $SO_2$ absorption towers, a portion of the effluent gases from these towers enriched in $CO_2$ content, are circulated counter-current in the carbonation cycle.

The carbonated smelt solution, essentially a sulphide-free solution of sodium carbonate and sodium bicarbonate freed of hydrogen sulphide, is the alkalizing solution used for the recovery of ammonia from the spent liquor.

The separated hydrogen sulphide obtained by carbonating and stripping the smelt liquor is led to the oxidizing zone of the furnace where, together with added air, the $H_2S$ content is converted to $SO_2$.

Losses of chemicals in any of these examples can be made up. Sodium losses are replaced by adding sodium carbonate, sodium bicarbonate, or sodium hydroxide to the spent cooking liquor at any appropriate point in the alkalizing step. Other sodium compounds, such as sodium sulphate can be added to the spent liquor, prior to the smelting operation or to the smelt solution. Ammonia losses can be made up by adding fresh ammonia to any of the cooking liquors as desired, and similarly with sulphur losses, sulphur dioxide can be added.

In operating the reducing zone of the furnace, some oxygen-containing gas, such as air must be admitted to provide sufficient oxygen in contact with the burning black ash, including the total oxygen content of the black ash, for combustion of the carbon and carbon compounds to carbon monoxide and carbon dioxide and of any hydrogen to water but insufficient to oxidize all of the carbon present to carbon dioxide. Moreover, the quantity of air employed is regulated so that the sodium sulphur compounds in the resulting smelt are obtained as sodium carbonate and sodium sulphide. An example of the reduction of sodium sulphur compounds to sodium sulphide and the formation of sodium carbonate under the defined reducing conditions may be expressed by the following formulas:

$$Na_2SO_4 + 4C = Na_2S + 4CO \quad (I)$$
$$Na_2SO_4 + 4CO = Na_2S + 4CO_2 \quad (II)$$
$$Na_2S + CO_2 + H_2O = Na_2CO_3 + H_2S \quad (III)$$

In the operation of the furnace, the most desirable situation economically as well as operationally, is realized where self-sustaining combustion takes place. This will be recognized as representative of the usual kraft furnace operation. Of course, fuel may be added to promote or sustain a combustion, but such is not economically desirable and I prefer to operate in the manner described such that self-sustaining combustion ensues to oxidize the carbonaceous matter and to reduce the inorganic sulphur compounds to sulphides and to form carbonates in the lower part of the furnace.

The amount of smelt solution containing alkaline sodium compounds which must be combined with spent liquor in order to substantially completely liberate the available ammonia content of the liquor by distillation and provide a liquor having a pH of at least about 7 after the ammonia has been distilled depends upon a number of variables present in connection with the spent liquor. Among these factors are the recycling of spent liquor to build up the total solids content of the spent liquor; the ammonia content of the spent liquor; the cooking cycle as regards time, temperature and pressure; the extent of the sulphur dioxide removal from the spent liquor; etc.

Generally, sufficient smelt solution should be employed to provide the spent liquor with a pH of at least about 7 and preferably at least about 8, after completion of ammonia stripping in order to obtain maximum ammonia recovery. If lesser amounts of smelt solution are used than those amounts which provide a pH of at least about 7, ammonia recovery decreases rapidly, particularly if the pH of the liquor after being stripped is less than about 6.5.

Details of carrying out the various steps of evaporating, distilling, make-up of the cooking liquors from the recovered $SO_2$ and ammonia, as well as various techniques in the economic use of heat values have not been presented. These details are already described in prior art and known in the pulping industry. The invention relates to a novel combination of steps whereby a balanced and substantially self-sustaining cyclic process is made possible through high chemical efficiency of chemicals recovery, in a state of purity satisfactory for use in an ammonia-base sulphite pulping process.

The present invention may be embodied in other specific forms without departing from the spirit or essential attributes thereof, and it is therefore desired that the present embodiments be considered in all respects as illustrative and not restrictive, reference being had to the appended claims rather than to the foregoing description to indicate the scope of the invention.

What I claim is:

1. A cyclical method for chemical recovery from a pulping process wherein an ammonia-base sulphite cooking liquor is employed which comprises combining spent cooking liquor with an aqueous solution containing sodium carbonate and sodium sulphide derived from processed spent cooking liquor in amounts sufficient for the substantially complete liberation by distillation of the available ammonia content of said spent cooking liquor and to provide such liquor with a pH of at least about 7 after removal of ammonia therefrom, stripping the available ammonia from said alkalized spent liquor and converting volatile sulphur compounds in said liquor to non-volatile sulphur compounds in a heated stripping zone by means of an oxygen-containing stripping gas, recovering said ammonia, concentrating by evaporation said alkalized spent liquor after stripping to increase the solids content thereof to at least about 40 percent by weight, subsequently burning said concentrated liquor under self-sustaining and reducing conditions for reduction of the sodium sulphur compounds present therein with the generation of volatile sulphides and the formation of a smelt containing sodium carbonate and sodium sulphide, oxidizing the volatilized sulphides to sulphur dioxide by means of an oxygen containing gas, recovering said sulphur dioxide, forming an aqueous solution of the smelt, combining the smelt solution with spent cooking liquor and forming a fresh cooking liquor containing an ammonium sulphite from said recovered ammonia and sulphur dioxide for use in a succeeding cycle.

2. The method of claim 1 wherein the oxygen-containing gases employed are air.

3. The method of claim 1 wherein a mixture of steam and air is employed to strip ammonia from the alkalized spent liquor with foam generation assisting in the transition of volatile sulphur compounds into non-volatile sulphur compounds.

4. The method of claim 1 wherein the spent cooking liquor is stripped of free and loosely combined sulphur dioxide before its alkalization with the smelt solution.

5. A cyclical method for chemical recovery from a pulping process wherein an ammonia-base sulphite cooking liquor is employed which comprises combining spent cooking liquor with an oxidized smelt solution containing sodium carbonate substantially free of sulphides derived from processed spent cooking liquor in an amount sufficient for the substantially complete liberation by distillation of the available ammonia content of said spent cooking liquor and to provide such liquor with a pH of at least about 7 after removal of ammonia therefrom, removing and recovering the available ammonia from said alkalized spent liquor, concentrating by evaporation said alkalized spent liquor to increase the solids content thereof to at least about 40 percent by weight, subsequently burning said concentrated liquor under self-sustaining and reducing conditions for reduction of the sodium sulphur compounds present therein with the generation of volatile sulphides and the formation of a smelt containing sodium carbonate, oxidizing the volatilized sulphides to sulphur dioxide by means of an oxygen-containing gas, recovering said sulphur dioxide, forming an aqueous solution of the smelt, heating and contacting said smelt solution with an oxygen-containing gas to convert residual volatile sulphur compounds present therein to non-volatile sulphur compounds, combining the oxidized smelt solution with spent cooking liquor and forming a fresh ammonia-base sulphite cooking liquor from said recovered ammonia and sulphur dioxide for use in a succeeding cycle.

6. The method of claim 5 wherein the oxygen-containing gases are air.

7. The method of claim 5 wherein the spent cooking liquor is stripped of free and loosely combined sulphur dioxide before its alkalization with the smelt solution and the sulphur dioxide is recovered.

8. A cyclical method for chemical recovery from a pulping process wherein an ammonia-base sulphite cooking liquor is employed which comprises combining spent cooking liquor with a carbonated smelt solution containing sodium carbonate substantially free of sulphides derived from processed spent cooking liquor in an amount sufficient for the substantially complete liberation by distillation of the avaible ammonia content of said spent cooking liquor and to provide such liquor with a pH of at least about 7 after removal of ammonia therefrom, removing and recovering the available ammonia from said alkalized spent liquor, concentrating by evaporation said alkalized spent liquor to increase the solids content thereof to at least about 40 percent by weight, subsequently burning said concentrated liquor under self-sustaining and reducing conditions for reduction of the sodium sulphur compounds present therein with the generation of volatile sulphides and the formation of a smelt, oxidizing the volatilized sulphides to sulphur dioxide by means of an oxygen-containing gas, recovering said sulphur dioxide, forming an aqueous solution of the smelt, contacting said smelt solution with a carbon dioxide containing gas to form carbonates and bicarbonates therein and to generate hydrogen sulphide, stripping said hydrogen sulphide from the smelt solution, burning the hydrogen sulphide to form sulphur dioxide, recovering the so-formed sulphur dioxide, combining the carbonated smelt solution with spent cooking liquor and forming a fresh ammonia-base sulphite cooking liquor from said recovered ammonia and sulphur dioxide for use in a succeeding cycle.

9. The method of claim 8 wherein the oxygen-containing gases are air.

10. The method of claim 8 wherein the spent cooking liquor is stripped of free and loosely combined sulphur dioxide before its alkalization with the carbonated smelt solution and the sulphur dioxide is recovered.

11. The method of claim 8 wherein the carbon dioxide containing gas is a flue gas resulting from the burning of the concentrated alkalized spent liquor, said flue gas having been freed of sulphur dioxide by its passage through a suitable absorption tower.

12. The method of claim 8 wherein the hydrogen sulphide stripping is effected by the carbon dioxide containing gas employed in carbonating the smelt solution.

13. The method of claim 8 wherein the hydrogen sulphide stripping is effected by steam.

14. The method of claim 8 wherein the cooking liquor contains ammonium bisulphite.

References Cited in the file of this patent

UNITED STATES PATENTS

| | | |
|---|---|---|
| 2,596,241 | Helleur | May 13, 1952 |
| 2,739,039 | Phelps | Mar. 20, 1956 |
| 2,772,965 | Gray | Dec. 4, 1956 |